United States Patent [19]

Izawa et al.

[11] Patent Number: 5,223,768
[45] Date of Patent: Jun. 29, 1993

[54] DATA DISPLAY APPARATUS WITH FUNCTION FOR CORRECTING EFFECT OF EXTERNAL MAGNETIC FIELD

[75] Inventors: Masao Izawa; Yuji Fujita, both of Kawasaki, Japan

[73] Assignee: Kikusui Electronics Corporation, Kanagawa, Japan

[21] Appl. No.: 777,934

[22] Filed: Oct. 17, 1991

[30] Foreign Application Priority Data

Oct. 18, 1990 [JP] Japan .................................. 2-277846

[51] Int. Cl.⁵ ......................... G09G 1/04; H01J 29/06; H01J 29/56; H04N 17/00
[52] U.S. Cl. ...................................... 315/367; 315/8; 315/370; 358/139
[58] Field of Search .................... 315/365, 367, 387, 8, 315/370; 358/10, 139

[56] References Cited
U.S. PATENT DOCUMENTS 4,812,713  3/1989  Blanchard ........................... 315/370
5,021,720  6/1991  Aimura ................................ 315/370
5,099,179  3/1992  Fox et al. ............................ 315/367

*Primary Examiner*—Gregory C. Issing
*Attorney, Agent, or Firm*—Finnegan, Henderson, Farabow, Garrett & Dunner

[57] ABSTRACT

A data display apparatus with a function for correcting the effect of external magnetic field including a display, a driving circuit for driving the display, an adjuster for adjusting a display position of input signal, a detector for detecting an output voltage of the driving circuit, and a difference detection circuit. The difference detection circuit detects a difference between an output of the detector when a predetermined reference signal is inputted as the input signal and an output of the detector when a display position of the predetermined reference signal is adjusted to a reference position on the screen of the display by the adjuster. The difference is stored in a memory as calibration data for correcting the effect of external magnetic field or the like.

1 Claim, 8 Drawing Sheets

DATA DISPLAY APPARATUS WITH FUNCTION FOR CORRECTING EFFECT OF EXTERNAL MAGNETIC FIELD

BACKGROUND OF THE INVENTION

1. Field of the Invention

The present invention relates to a data display apparatus for displaying input data on a CRT (Cathode-Ray Tube) having format such as scales and characters preformed on a screen, and more particularly, to a data display apparatus with a function for correcting the effect of external magnetic field such as geomagnetism.

2. Description of the Prior Art

A CRT used in a data display apparatus produces images such as waveforms, figures, characters or the like on a fluorescent screen by hitting the screen with an electron beam.

A digital oscilloscope and a logic analyzer are examples of the apparatuses that use CRTs. A major function of a digital oscilloscope is to perform analog-to-digital conversion on an input signal so as to store the converted digital data into a memory, and to perform digital-to-analog conversion on the stored digital data in order to display the converted analog signal on the screen of the CRT as an image of the input signal.

The electron beam of the CRT, however, is subjected to the effect of external magnetic field such as geomagnetism. Accordingly, changes in positional relationship between the digital oscilloscope and the external magnetic field alter positions of the waveform of the input signal on the screen of the CRT. The scales fixed on the screen, however, are not subjected to the effect of the external magnetic field. Consequently, the waveform of the input signal is displaced with regard to the format on the screen by the effect of the external magnetic field.

Some digital oscilloscopes have a function to transfer the stored data in the memory to an external hardcopy device such as a plotter or a printer via an interface. Such a digital oscilloscope can also transmit the following stored data to an external hardcopy device: stored input data; stored format data which correspond to scales and characters preformed on the screen of the CRT by printing or the like; and stored data representing characters and a cursor to be drawn on the screen by an electronic beam. Thus, the format data such as scales are stored in the memory beforehand, and are transferred together with the stored input data to the external hardcopy device. On the basis of these data, the external device reproduces the image similar to that displayed on the CRT of a digital oscilloscope or the like.

In such apparatuses, when displacement of waveforms of input signals is induced by the effect of external magnetic field, the image displayed on the screen of the CRT of the digital oscilloscope or the like and the image reproduced by the external device disagree. This is because the image reproduced by the external device maintains correct position because the stored data and format data in the memory are not affected by the external magnetic field.

For this reason, a conventional data display apparatus eliminates the effect of the external magnetic field by providing the data display apparatus with a magnetic shield so that the image displayed on the data display apparatus and the image reproduced on the external device will coincide.

Another technique is proposed which displays format data together with the input signal data on the screen of the CRT by using the electron beam instead of providing the preformed format on the screen of the CRT. This technique can prevent the relative displacement between the images of the input signal and format because these two images are equally displaced by the external magnetic field.

However, the first method of providing the magnetic shield presents problems in that it is technically difficult to perform a complete magnetic shield, and that the apparatus becomes costly because magnetic shield materials are expensive. In addition, achieving a complete magnetic shield will make the apparatus heavier and larger.

The second method of displaying the format together with the input signal presents problems in that the amount of display increases by the amount of displaying the format. In particular, the apparatus employing an electrostatic deflection CRT has a problem in that the image flicker occurs because of increased update duration of the image. Furthermore, this method requires a position calibration instrument for correcting the position of an entire image which must be uniformly displaced.

SUMMARY OF THE INVENTION

Accordingly, it is an object of the present invention to provide an inexpensive data display apparatus that can eliminate the effect of the external magnetic field on the electronic beam of the CRT so as to prevent the displacement and flicker of an image.

Another object of the present invention is to provide a data display apparatus that can eliminate disagreement between the displayed image on the CRT and the hardcopy produced by an external device.

In a first aspect of the present invention, a data display apparatus with a function for correcting the effect of external magnetic field comprises:

display means for displaying an image, the display means having a preformed format on its screen;

driving means for driving the display means in response to an input signal to be displayed;

adjusting means for adjusting a display position of the input signal on the screen of the display means;

detection means for detecting an output voltage of the driving means;

difference detection means for detecting a difference between an output of the detection means when a predetermined reference signal is inputted as the input signal and an output of the detection means when a display position of the predetermined reference signal is adjusted to a reference position on the screen of the display by the adjusting means; and memory means for holding the difference which the difference detection means has detected, as correction data.

Here, the data display apparatus with a function for correcting the effect of external magnetic field may further comprise format storing means for storing format data corresponding to the preformed format, and output means for supplying an external output hardcopy device with a signal corresponding to input data to be displayed together with format data.

The predetermined reference signal may be a signal corresponding to a ground signal.

The data display apparatus with a function for correcting the effect of external magnetic field may further comprise data storing means for storing input data converted into digital form and stored to be displayed, and a first digital-to-analog converter for converting the input data stored in the data storing means into an analog form to be supplied to the driving means.

The data display apparatus with a function for correcting the effect of external magnetic field may further comprise correction means for correcting a display position of the input data by adding the correction data held in the memory means to the input data, and by supplying an added result to the first digital-to-analog converter.

The data display apparatus with a function for correcting the effect of external magnetic field may further comprise a second digital-to-analog converter for converting the correction data into an analog form, wherein the driving means is a differential amplifier, the first digital-to-analog converter converts the input data into an analog form to be applied to a noninverting input terminal of the differential amplifier, and the second digital-to-analog converter applies the converted correction data to an inverting input terminal of the differential amplifier.

The display means may be a CRT.

The adjusting means may be a variable resistor operatively connected to the driving means.

In a second aspect of the present invention, a data display apparatus with a function for correcting the effect of external magnetic field comprises:

display means for displaying an image, the display means having a preformed format on its screen;

vertical driving means for driving a vertical axis of the display means in response to a vertical input signal;

vertical adjusting means for adjusting a vertical display position of the vertical input signal on the screen of the display means;

vertical detection means for detecting an output voltage of the vertical driving means;

vertical difference detection means for detecting a difference between an output of the vertical detection means when a predetermined reference signal is inputted as the vertical input signal and an output of the vertical detection means when a vertical display position of the predetermined reference signal is adjusted to a vertical reference position on the screen of the display by the vertical adjusting means;

horizontal driving means for driving a horizontal axis of the display means in response to a horizontal input signal;

horizontal adjusting means for adjusting a horizontal display position of the horizontal input signal on the screen of the display means;

horizontal detection means for detecting an output voltage of the horizontal driving means;

horizontal difference detection means for detecting a difference between an output of the horizontal detection means when a predetermined reference signal is inputted as the horizontal input signal and an output of the horizontal detection means when a horizontal display position of the predetermined reference signal is adjusted to a horizontal reference position on the screen of the display by the horizontal adjusting means; and memory means for holding the difference which the vertical difference detection means has detected as vertical correction data, and for holding the difference when the horizontal difference detection means has detected as horizontal correction data.

According to the present invention, the difference, which is detected by the difference detection means as the displacement between the reference position at which the reference value of the input data should be displayed and the actual position at which the reference value of the input data is really displayed, is applied to the driving means of the CRT so that the driving means adjusts the actual position of the reference value of the input data to coincide with the reference position of the scales. The displacement of the input data is corrected in the same manner.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 1:
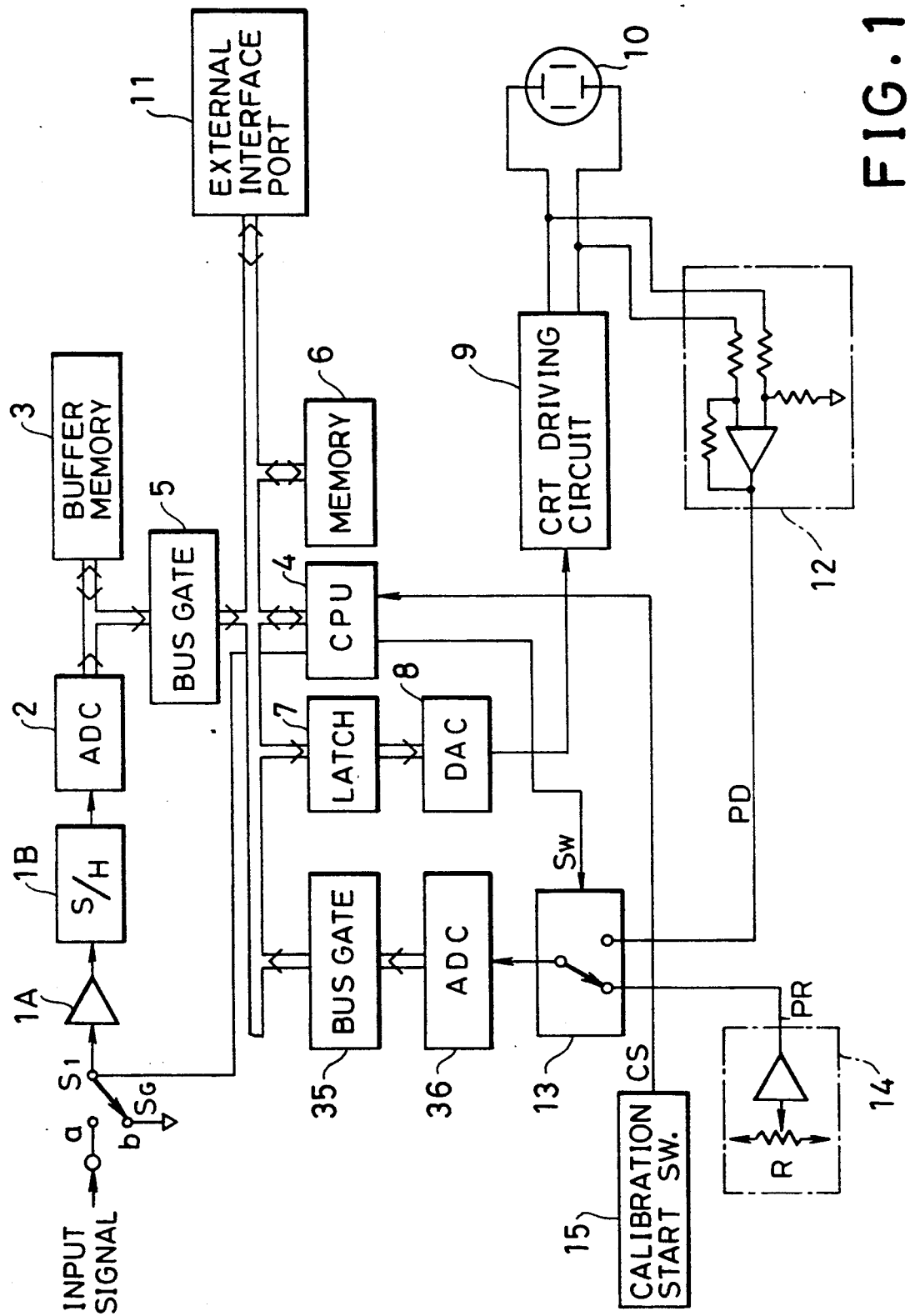
FIG. 1 is a block diagram showing an arrangement of a first embodiment of a data display apparatus according to the present invention.

FIG. 1 is a block diagram showing an arrangement of a first embodiment of a digital oscilloscope according to the present invention.

In FIG. 1, an input signal is applied to an input amplifier 1A to be amplified via a switch S1, and then is converted into a digital signal by a sample-and-hold circuit 1B and an analog-to-digital converter 2. The digital signal is saved into a buffer memory 3 as input data. The input data in the buffer memory 3 is transferred to a RAM section of a memory 6 through a bus gate 5 by a command of a CPU 4, and is stored into the memory 6. The input data stored in the memory 6 is then transferred to a digital-to-analog converter 8 through a latch 7 by a command of the CPU 4. The digital-to-analog converter 8 converts the input data into an analog signal, and feeds it to a CRT driving circuit 9. The CRT driving circuit 9 drives a CRT 10 in accordance with the analog signal in order to display the waveform of the input signal on the screen of the CRT 10.

In a ROM section of the memory 6, are saved format data in advance. The format data are used to record predetermined format like scales and characters on a hardcopy outputted by an external device. The format data, together with the input data stored in the memory 6, are fed to an external hardcopy device such as a printer or plotter through an external interface port 11 by a command of the CPU 4.

Figure 2:
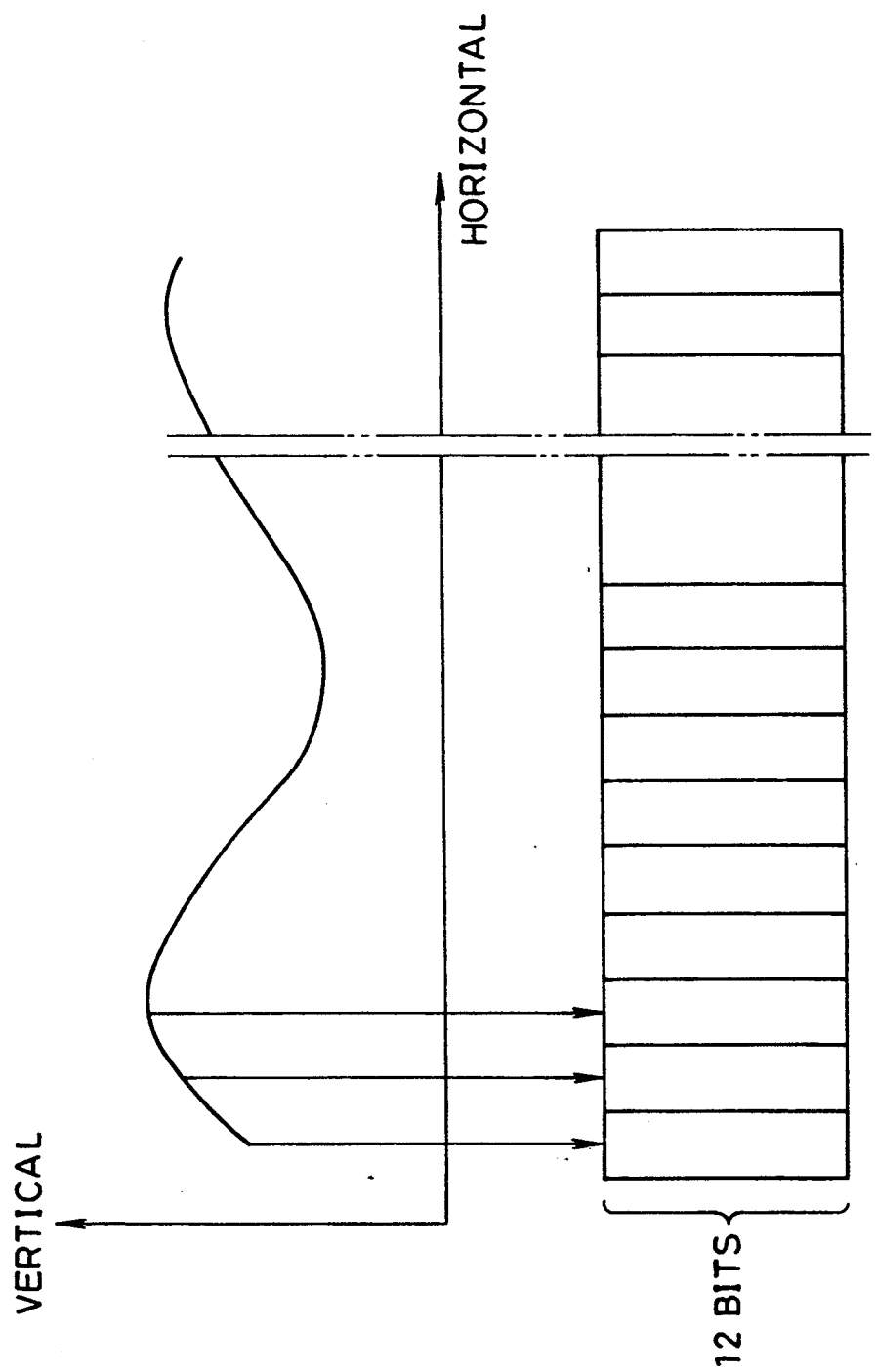
FIG. 2 is a diagram illustrating the correspondence between an input signal and stored data of the input signal.
Figure 3:
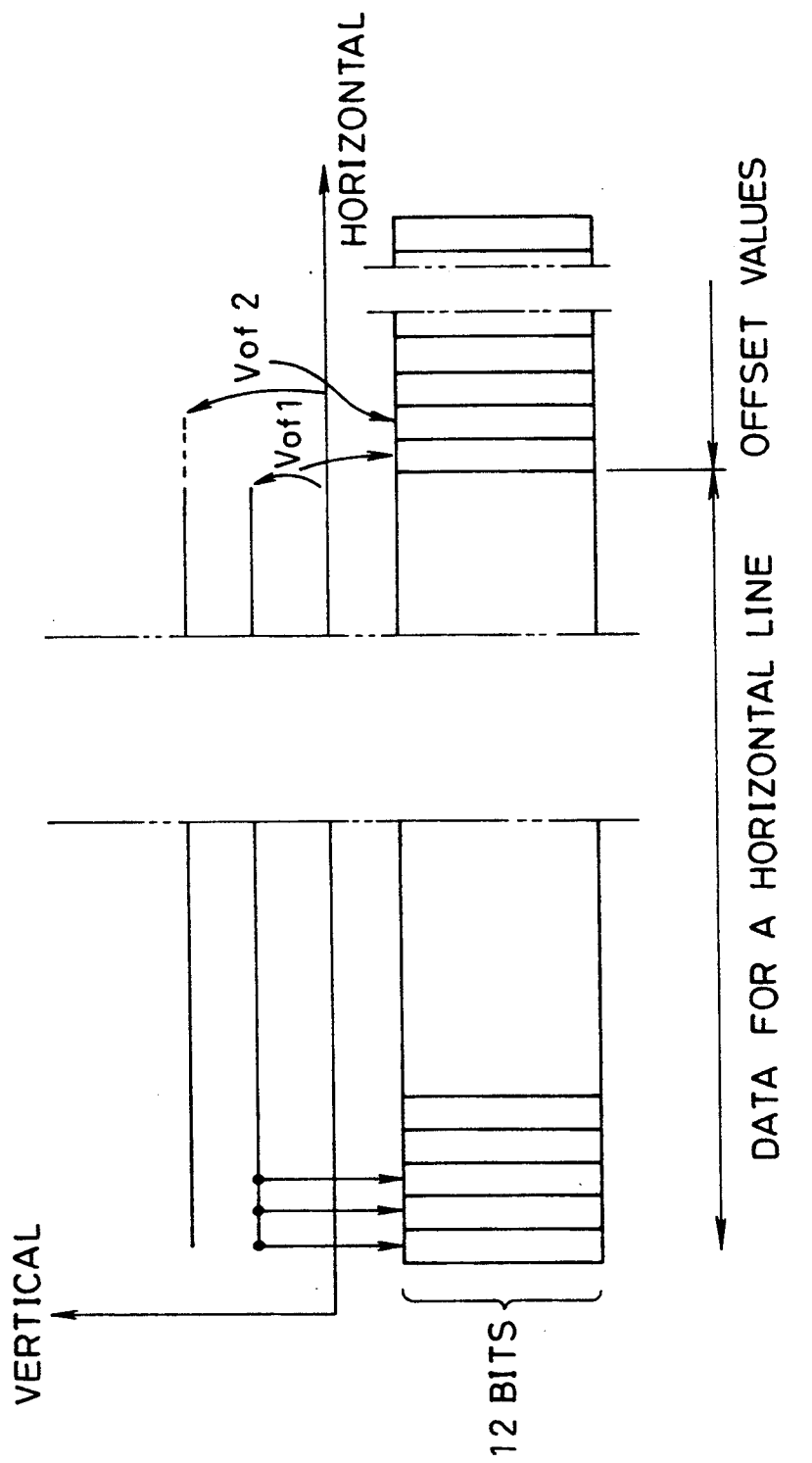
FIG. 3 is a diagram illustrating the correspondence between the format data to be recorded by an external hardcopy device and the stored data thereof.

Here, input data and format data are stored in the memory 6 as illustrated in FIGS. 2 and 3, respectively. Each sampled value is converted into a 12-bit data, and is stored in the RAM section of the memory 6 as a vertical value of a display as shown in FIG. 2.

On the other hand, the format data, which corresponds to the format on a CRT screen and is outputted only to an external device, is stored in the ROM section of the memory 6 as shown in FIG. 3. Horizontal scales are stored in the form of line data representing a horizontal line and in the form of offset values such as $V_{o/1}$, $V_{o/2}$ indicating vertical positions of the line data. The horizontal central line REF corresponding to the horizontal central line of the CRT screen is represented by half the maximum offset value in the vertical direction. Likewise, vertical scales are stored in the form of line data representing a vertical line and in the form of offset values indicating horizontal positions of the line data. The vertical central line corresponding to the vertical central line of the CRT screen is represented by half the maximum offset value in the horizontal direction. In addition, characters to be displayed on the CRT screen are arranged in dot-matrix forms, and are stored in the ROM section of the memory 6.

Figure 4:
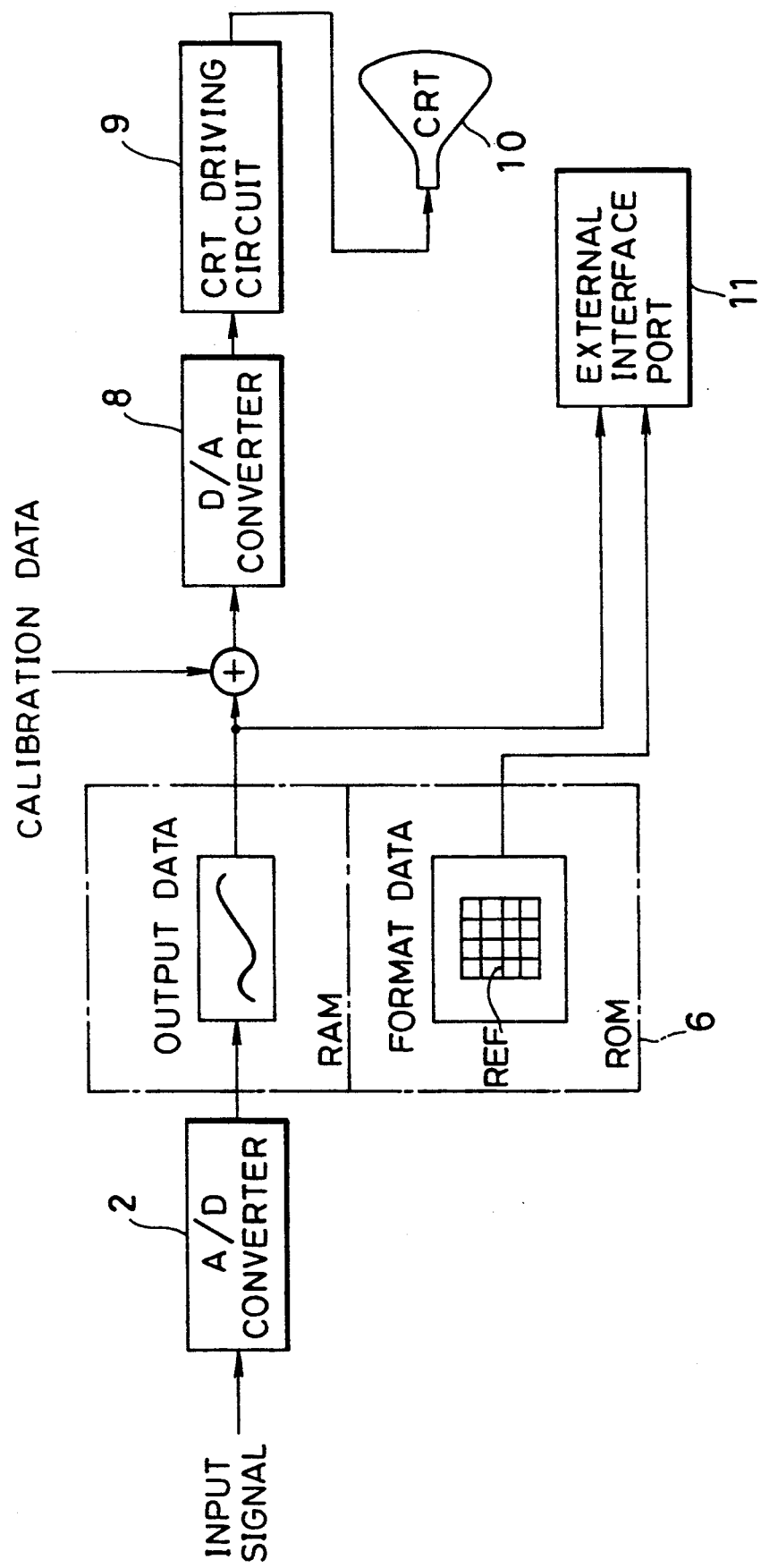
FIG. 4 is a diagram illustrating the data flow of the first embodiment.

Only the input data in the memory 6 are supplied to both the CRT 10 and to the external device, whereas the format data are fed only to the external device through the external interface port 11, as shown in FIG. 4.

Returning to FIG. 1, a position detection circuit 12 includes a differential amplifier for detecting the output of the CRT drive circuit 9, that is, the driving voltage of the CRT 10. The detected driving voltage is supplied to a switch 13 as a position detection signal PD. The switch 13 receives the position detection signal PD from the position detection circuit 12 and a reference position signal PR from a position designation circuit 14, and selects one of the two signals. The position designation circuit 14 includes a variable resistor R which is manually controlled by an operator to adjust the display position of an image on the screen of the CRT 10, and a buffer amplifier for amplifying an output of the variable resistor. Thus, the position designation circuit 14 supplies the switch 13 with the output voltage of the variable resistor R via the buffer amplifier as the reference position signal PR when an operator manually adjust the display position of the reference signal to a reference position on the screen of the CRT 10. The switch 13 selects either the input signal PR or PD in response to a switching signal Sw supplied from the CPU 4, and feeds the selected signal to an analog-to-digital converter 36 whose output terminal is connected to an input terminal of a bus gate 35. Reference numeral 15 designates a calibration start switch for supplying a calibration start signal to the CPU 4 in the calibration mode described later. The calibration start switch 15 is mounted on a front panel of the apparatus.

Next, the operation of the first embodiment thus arranged will be described with reference to FIGS. 5 and 6.

Figure 5:
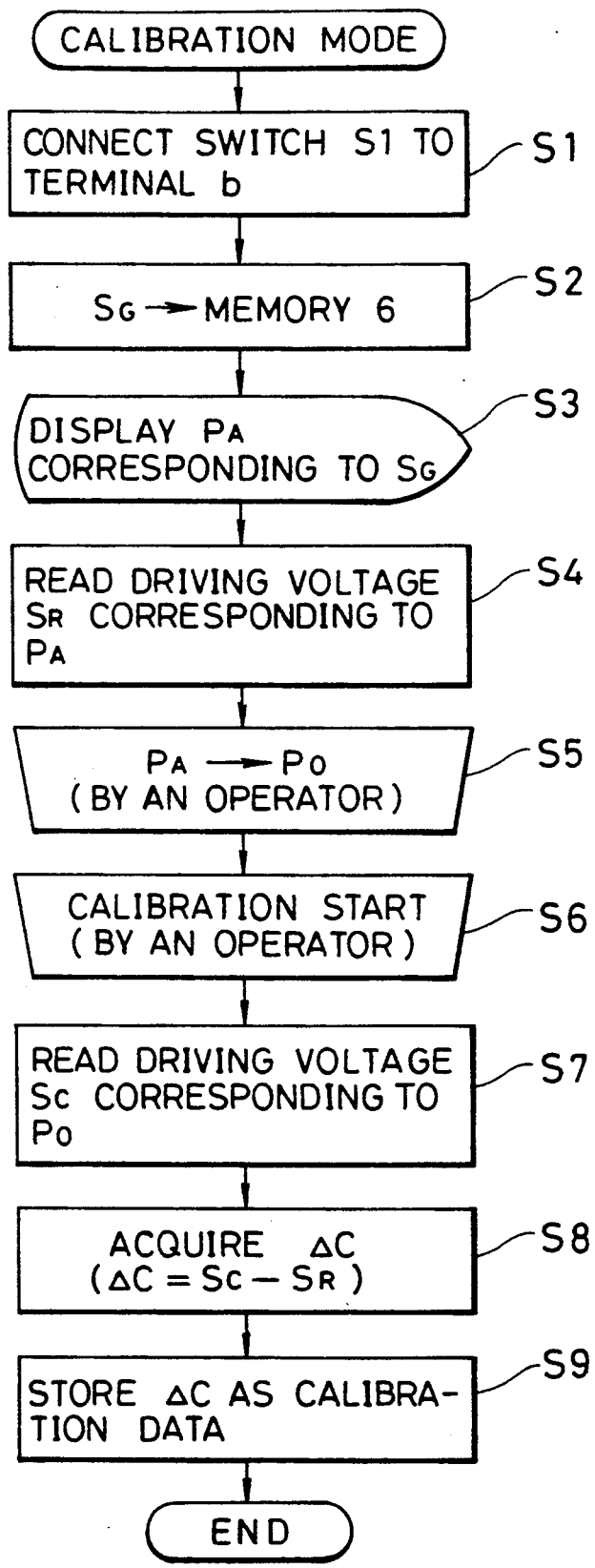
FIG. 5 is a flowchart illustrating procedures of the calibration mode executed by the CPU of the first embodiment.

When an image displacement occurs owing to the effect of an external magnetic field or the like, the operator, handling a mode switch on the front panel, switches the mode of the apparatus into a calibration mode where the CPU 4 executes the procedures shown in FIG. 5. In the description below, it is assumed that the input signal of the ground level is displayed on the horizontal central line on the screen of the CRT 10 when there is no effect of the external magnetic field. It is also assumed that the input data obtained by quantizing the input signal of the ground level has a value identical to the offset value REF which corresponds to the horizontal central line of the format data stored in the memory 6 as shown in FIG. 4.

FIG. 5 is a flowchart illustrating procedures processed by the CPU 4 in the calibration mode.

When the mode switch is changed into the calibration mode, the CPU 4 proceeds to step S1, and connects the switch S1 to its terminal b so that the input signal SG of the ground level is supplied, as a reference input signal, to the analog-to-digital converter 2 via the input amplifier 1A and the sample-and-hold circuit 1B.

At step S2, the CPU 4 writes the reference data SG produced from the analog-to-digital converter 2 into the memory 6. In this case, the value identical to that of REF is stored to all the addresses of the memory illustrated in FIG. 2.

Figure 6:
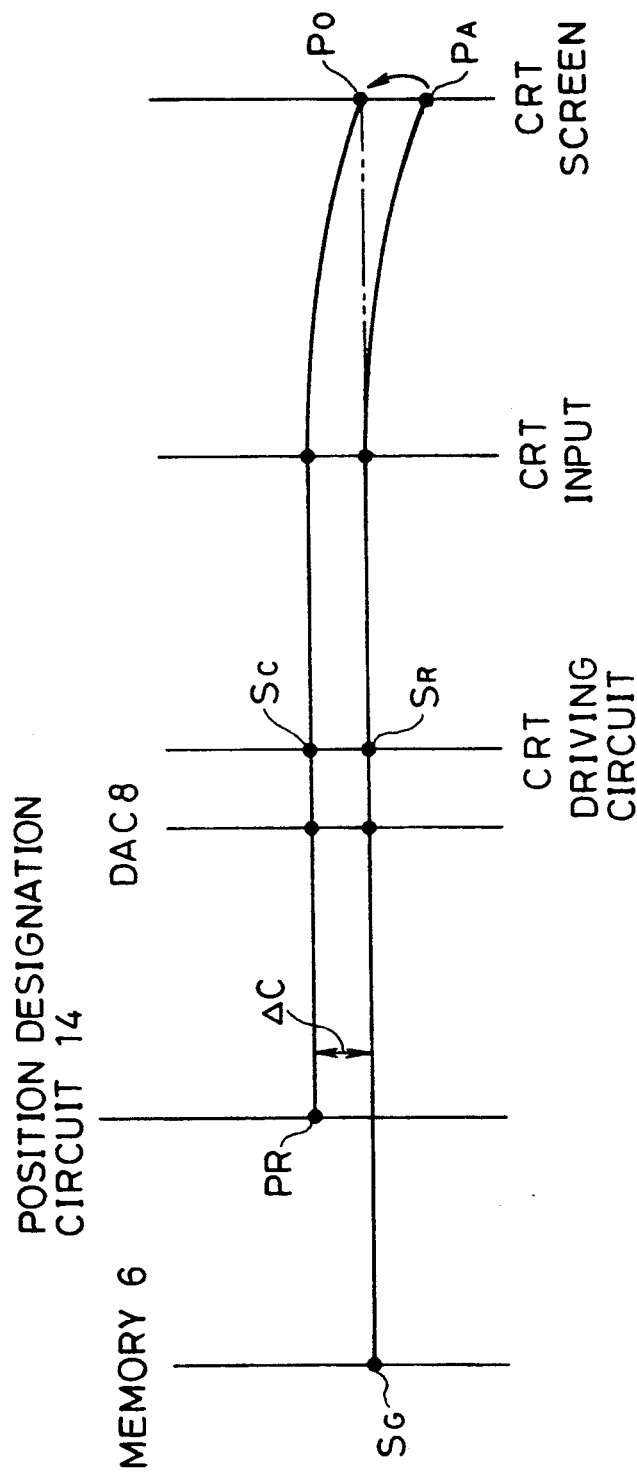
FIG. 6 is a diagram illustrating the correspondence between signals at various stages of the first embodiment.

At step S3, the reference data SG is supplied to the CRT driving circuit 9 via the latch 7 and the digital-to-analog converter 8 so that a line PA corresponding to the reference data SG is displayed on the CRT 10 as shown in FIG. 6.

At step S4, the driving voltage SR (the output voltage of the CRT driving circuit 9) corresponding to the line PA is detected by the position detection circuit 12, and the detected voltage PD is converted into digital data SR by the analog-to-digital converter 36 to be stored into the memory 6.

The effect of the external magnetic field, if there is any, will displace the image of the calibration reference data upward or downward on the screen so that the image does not appear at the center, i.e., at the reference position P0 of the screen of the CRT 10. Thus, the display position PA does not agree with the correct reference position P0 as illustrated in FIG. 6. Here, the CPU 4 maintains the driving voltage at SR, and controls the switch 13 with the switch signal Sw so that the output PR of the position designation circuit 14 is fed to the analog-to-digital converter 36. After that, the CPU 4 proceeds to step S5.

At step S5, the CPU 4 controls the CRT driving circuit 9 so that the drive voltage becomes SG+PR. Here, an operator controls the variable resistor R in the position designation circuit 14 so that the display position PA coincides with the reference position P0 on the CRT screen. When the display position PA coincides with the reference position P0, the operator depresses the calibration start switch 15 at step S6.

At step S7, the CPU 4 reads the driving voltage SC corresponding to the reference position P0 by way of the position detection circuit 12, the switch 13, the analog-to-digital converter 36 and the bus gate 35.

At step S8, the CPU 4 calculates calibration data ΔC by subtracting the driving voltage SR corresponding to the line PA from the driving voltages SC corresponding to the line P0 as illustrated in FIG. 6.

At step S9, the CPU 4 stores the calibration data ΔC into the memory 6, and exits the calibration process.

Once the calibration data has been obtained, the CPU 4, entering into the normal mode, corrects an input signal to be displayed by using the calibration data: the CPU adds the calibration data to the input data obtained by converting the input signal into a digital form, and supplies it to the driving circuit 9 via the latch 7 and the digital-to-analog converter 8.

Figure 7:
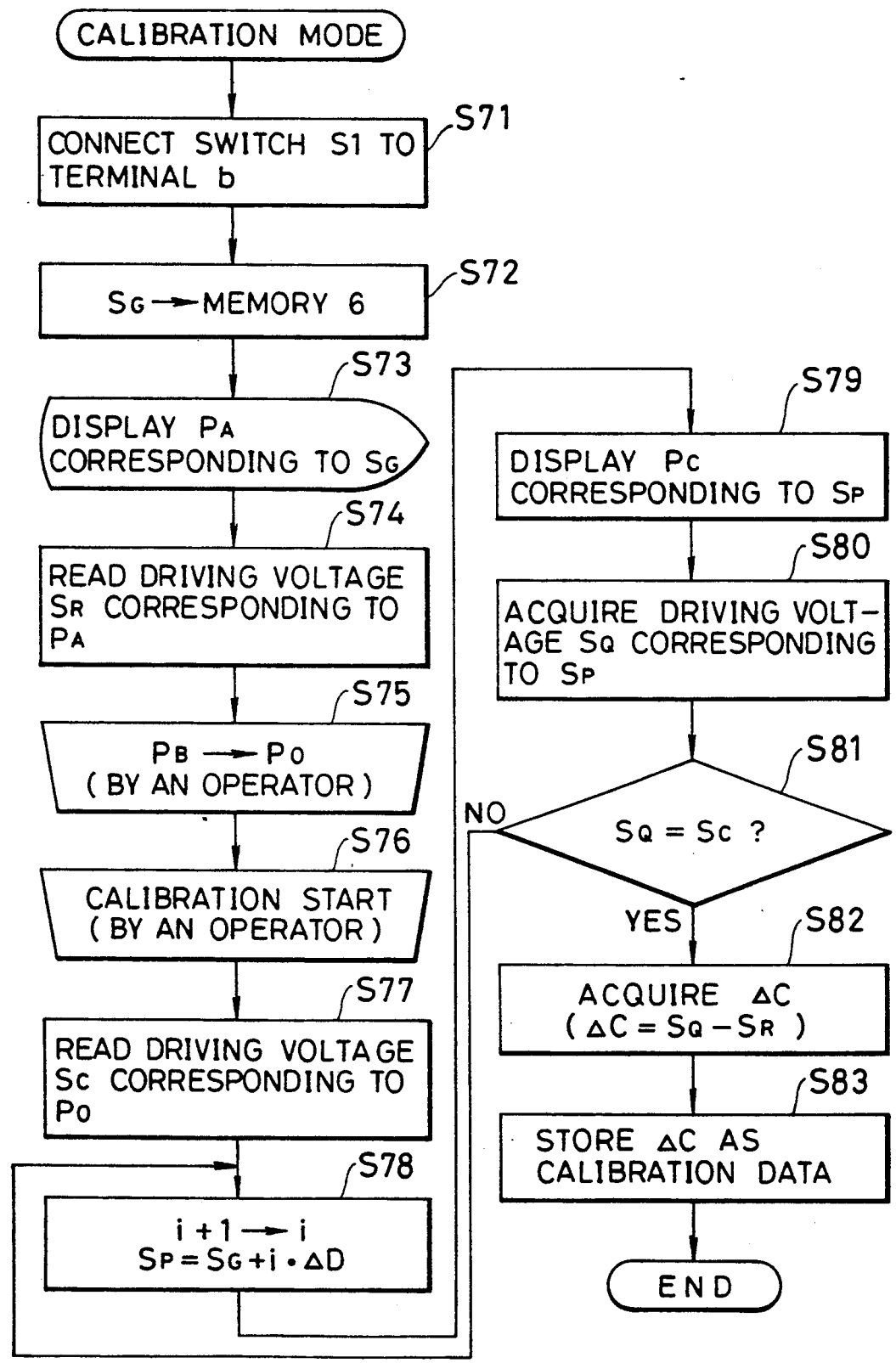
FIG. 7 is a flowchart illustrating another process executed in the calibration mode of the first embodiment.

FIG. 7 is a flowchart showing another example of procedures which the CPU 4 processes in the calibration mode. In this flowchart, steps S71 to S74 are identical to the steps S1 to S4 in FIG. 5, and hence, the description thereof will be omitted here.

At step S75, the CPU 4 controls the switch 13 so that the output signal PR of the position designation circuit 14 is applied to the analog-to-digital converter 36 to be converted into digital data. The digital data PR is supplied to the latch 7 and then to the digital-to-analog converter 8, and the analog output of the converter 8 is fed to the CRT driving circuit 9. Accordingly, in this state, the electron beam hits the position PB on the screen of the CRT 10 corresponding to the output signal PR of the position designation circuit 14.

In this state, an operator controls the variable resistor R in the position designation circuit 14 so that the display position PB coincides with the reference position P0 on the CRT screen, which is defined as the horizontal central line on the screen as shown in FIG. 6. When the display position PB coincides with the reference position P0, the operator depresses the calibration start switch 15 at step S76 so that a calibration start signal CS is supplied to the CPU 4.

When the CPU 4 receives the calibration start signal CS, it proceeds to step S77, and reads the driving voltage SC corresponding to the reference position P0. The driving voltage SC is applied to the analog-to-digital converter 36 via the switch 13 to be converted into a digital form, and is stored into the memory 6 as the driving voltage of the reference position P0.

At the next step S78, the CPU 4 supplied the reference data SG, which corresponds to the ground level input signal and has been stored in the memory 6 at step S72, to the CRT driving circuit 9 via the latch 7 and the digital-to-analog converter 8. Here, the effect of the external magnetic field, if there is any, will displace the image of the calibration reference data upward or downward on the screen so that the image does not appear at the center, i.e., at the reference position P0 of the screen of the CRT 10.

In this state, the CPU 4 increments the reference data SG by an amount ΔD to produce data SP at step S78, and supplies the data SP to the CRT driving circuit 9 by way of latch 7 and the digital-to-analog converter 8 at step S79, so that a line PC corresponding to the data SP is displayed with the driving voltage of SQ.

At step S80, the position detection circuit 12 detects the driving voltage (the output of the CRT driving circuit 9) SQ corresponding to the data SP.

At step S81, the driving voltage SQ is tested if it is equal to the driving voltage SC corresponding to the reference position P0. If the test result is negative, the processing returns to step S78, and the data SP is incremented by the amount ΔD, followed by steps S78–S81, which are executed cyclically until the driving voltage SQ becomes equal to the driving voltage SC.

When the test result at step S81 becomes positive, the CPU 4 calculates the calibration data ΔC by subtracting the driving voltage SR from the driving voltage SQ at step S82. Then, the CPU 4 stores the calibration data ΔC in the memory 6, thus terminating the calibration procedures.

After that, the CPU 4 adds the calibration data to input data obtained by performing analog-to-digital conversion of the input data, and supplies the data to the CRT driving circuit 9 through the latch 7 and the digital-to-analog converter 8.

Thus, the positional error on the screen of the CRT 10 can be corrected by adding calibration data for eliminating the effect of the external magnetic field. The calibration data is not added to the data to be outputted to the external device, and hence, an image on the screen of the CRT 10 and the image recorded by the external device do not disagree in their positions.

Although in this embodiment, the ground level of an input signal is selected as a reference value, and the horizontal central line on the screen of the CRT is selected as a reference position, the reference value and the reference position can be arbitrarily selected as long as the correspondence between the two are definite.

EMBODIMENT 2

Figure 8:
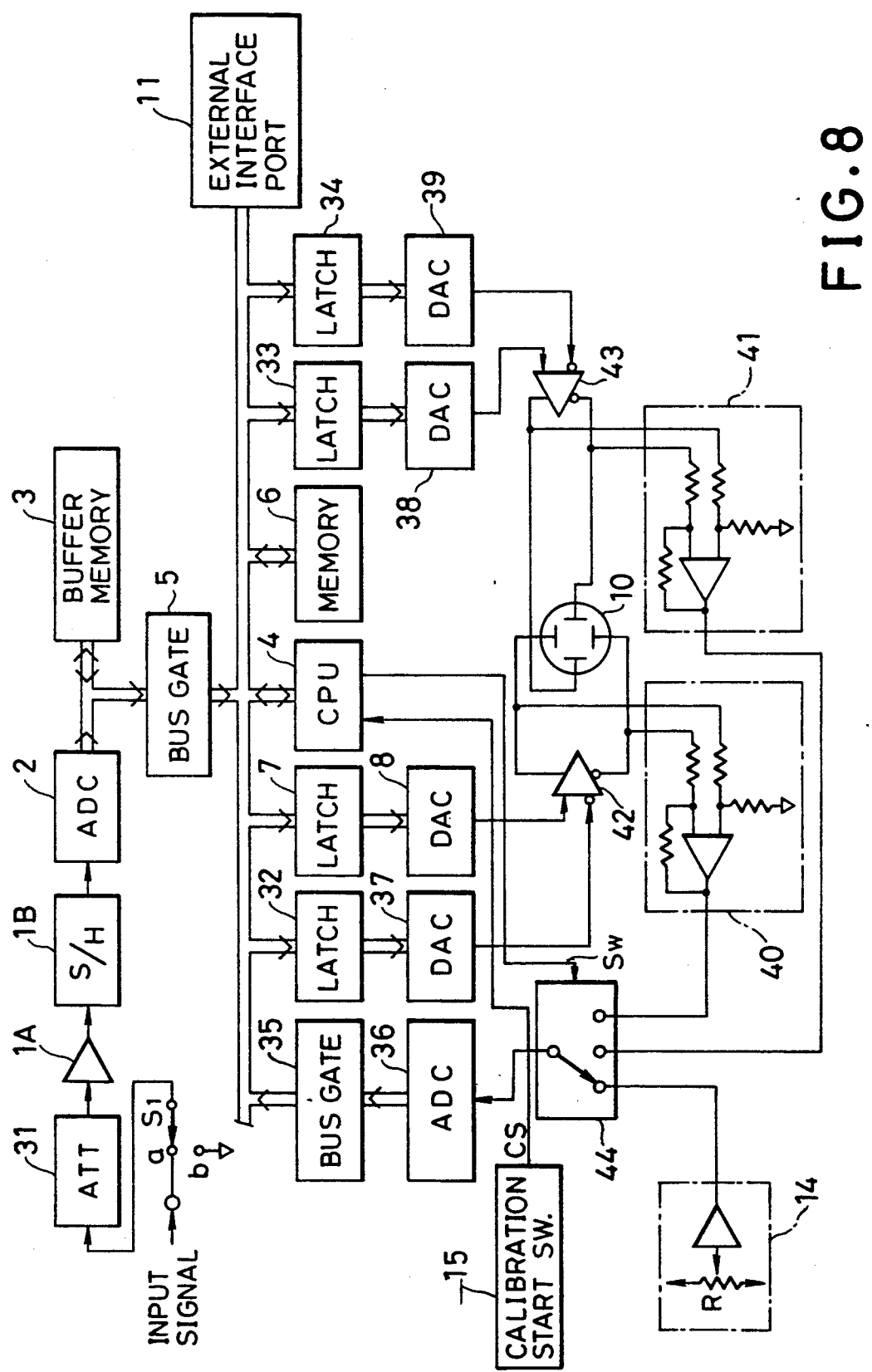
FIG. 8 is a block diagram showing an arrangement of a second embodiment of a data display apparatus according to the present invention.

FIG. 8 is a block diagram of a second embodiment of a data display apparatus with a function for correcting the effect of external magnetic field according to the present invention. In this second embodiment, calibration is carried out not only in the vertical direction but also in the horizontal direction.

In FIG. 8, corresponding parts to those of FIG. 1 are designated by the same reference numerals. In addition, reference numeral 31 denotes an attenuator; 32–34, latches; 35, a bus gate; 36, an analog-to-digital converter; 37–39, digital-to-analog converters; 44, a switch for selecting a signal to be outputted to the analog-to-digital converter 36; 40, a vertical position detection circuit; and 41, a horizontal position detection circuit. Both the vertical and horizontal position detection circuits 40 and 41 operate as the position detection circuit 12 shown in FIG. 1. The outputs of the position detection circuits 40 and 41 and the output of the position designation circuit 14 are supplied to the switch 44 so that one of the three inputs are selected by the switch 44 in accordance with the switch signal Sw supplied from the CPU 4, and the selected signal is applied to the analog-to-digital converter 36.

A differential amplifier 42 operates as a CRT driving circuit in the vertical direction, whereas a differential amplifier 43 operates as a CRT driving circuit in the horizontal direction.

The second embodiment differs from the first embodiment in that, when the vertical display position is to be calibrated, for example, the calibration data is inputted to the inverting input terminal of the differential amplifier 42 through the latch 32 and digital-to-analog converter 37. In other words, although in the first embodiment, the display position is corrected by adding the calibration data to the input data, in the second embodiment, the display position is corrected by applying the offset voltage corresponding to the calibration data to the differential amplifier 42 functioning as a driving circuit.

Since the processing procedures of the display position calibration in the vertical and horizontal directions are the same to those of the first embodiment, the description thereof is omitted here. As the reference data of the calibration in the horizontal direction, all "0" or all "1" data is applied to the digital-to-analog converter 38. In this case, a vertical line at the left-hand edge or at the right-hand edge on the CRT screen is displayed, if the effect of external magnetic field does not exist, and hence, it is simply sufficient for an operator to control the variable resistor R of the position designation circuit 14 so that this display position coincide with the reference position (the left-hand edge or the right-hand edge) on the CRT screen.

A digital oscilloscope of this embodiment, which can achieve display position correction not only in the vertical direction but also in the horizontal direction, is particularly effective when measurement is carried out under a strong magnetic field. By using a digital oscilloscope of this embodiment with a calibration in the vertical and horizontal directions before a measurement in the very place where the measurement is carried out, even when waveform data are recorded by a plotter or a printer in the form of a hardcopy, a displayed image on the CRT and that of the hardcopy will not disagree in positions.

Although the embodiments described above are applied to a digital oscilloscope, the present invention can be applied to a common real-time oscilloscope. In a common real-time oscilloscope, set ranges, a cursor, a read value of the cursor and the like are displayed on the CRT screen, and these images together with the entire image including them may be displaced by the effect of external magnetic field or by changes in temperature. To correct the displayed position in a conventional oscilloscope, an inner part must be adjusted after removing a casing thereof. The present invention, however, makes it possible to easily correct the displayed position, thereby achieving a high-quality display.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A data display apparatus with a function for correcting the effect of external magnetic field comprising:
   display means for displaying an image, said display means having a preformed format on its screen;
   driving means for driving said display means in response to an input signal to be displayed;
   adjusting means for adjusting a display position of the input signal on the screen of said display means;
   detection means for detecting an output voltage of said driving means;
   difference detection means for detecting a difference between an output of said detection means when a predetermined reference signal is inputted as the input signal and an output of said detection means when a display position of the predetermined reference signal is adjusted to a reference position on the screen of said display by said adjusting means;
   memory means for holding the difference which said difference detection means has detected, as correction data;
   data storing means for storing input data converted into digital form for subsequent display;
   a first digital-to-analog converter for converting the input data stored in said data storing means into an analog form to be supplied to said driving means; and
   a second digital-to-analog converter for converting the correction data into an analog form, wherein said driving means is a differential amplifier, said first digital-to-analog converter converts the input data into an analog form to be applied to a noninverting input terminal of said differential amplifier, and said second digital-to-analog converter applies the converted correction data to an inverting input terminal of said differential amplifier.

* * * * *